(12) United States Patent
Gysling et al.

(10) Patent No.: US 6,558,036 B2
(45) Date of Patent: May 6, 2003

(54) NON-INTRUSIVE TEMPERATURE SENSOR FOR MEASURING INTERNAL TEMPERATURE OF FLUIDS WITHIN PIPES

(75) Inventors: Daniel L. Gysling, Glastonbury, CT (US); Richard T. Jones, Hamden, CT (US); Allen R. Davis, Falls Church, VA (US)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 09/726,062

(22) Filed: Nov. 29, 2000

(65) Prior Publication Data

US 2002/0064206 A1 May 30, 2002

(51) Int. Cl.$^7$ .......................... G01K 1/08; G01K 13/00; G01K 11/00
(52) U.S. Cl. ........................ 374/147; 374/136; 374/161
(58) Field of Search ............................. 374/136, 147, 374/161

(56) References Cited

U.S. PATENT DOCUMENTS

| | | | |
|---|---|---|---|
| 2,967,429 A | 1/1961 | Taylor | |
| 3,149,492 A | 9/1964 | Weinberg | 73/393 |
| 4,080,837 A | 3/1978 | Alexander et al. | 73/61 R |
| 4,445,389 A | 5/1984 | Potzick et al. | 73/861.27 |
| 4,515,473 A | 5/1985 | Mermelstein | 356/33 |
| 4,520,320 A | 5/1985 | Potzick et al. | 328/133 |
| 4,706,501 A | 11/1987 | Atkinson et al. | 73/730 |
| 4,871,263 A * | 10/1989 | Wilson | 374/140 |
| 4,968,151 A * | 11/1990 | Thomson | 374/135 |
| 4,971,452 A * | 11/1990 | Finney | 374/208 |
| 4,976,151 A | 12/1990 | Morishita | 73/730 |
| 5,024,099 A | 6/1991 | Lee | 73/730 |
| 5,031,460 A | 7/1991 | Kanenobu et al. | 73/730 |
| 5,040,415 A | 8/1991 | Barkhoudarian | 73/198 |
| 5,083,452 A | 1/1992 | Hope | 73/61 R |
| 5,172,979 A * | 12/1992 | Barkley et al. | 374/147 |
| 5,218,197 A | 6/1993 | Carroll | 250/227.19 |
| 5,363,342 A | 11/1994 | Layton et al. | 367/149 |
| 5,398,542 A | 3/1995 | Vasbinder | 73/40.5 |
| 5,440,932 A | 8/1995 | Wareham | 73/730 |
| 5,454,641 A * | 10/1995 | Parker et al. | 374/147 |
| 5,591,922 A | 1/1997 | Segeral et al. | 73/861.04 |
| 5,670,720 A | 9/1997 | Clark et al. | 73/730 |
| 5,707,151 A * | 1/1998 | Parker et al. | 374/147 |
| 5,741,980 A | 4/1998 | Hill et al. | 73/861.04 |
| 5,845,033 A | 12/1998 | Berthold et al. | 385/12 |
| 6,334,707 B1 * | 1/2002 | Ku | 374/147 |
| 6,350,056 B1 * | 2/2002 | Helmig et al. | 374/161 |

FOREIGN PATENT DOCUMENTS

| | | | |
|---|---|---|---|
| DE | 19808222 | 2/1998 | |
| GB | 2062860 A * | 5/1981 | 374/147 |
| WO | WO/0036386 | 12/1999 | |

OTHER PUBLICATIONS

"Noise and Vibration Control Engineering Principles and Applications", Leo L. Beranek and Istvan L. Ver, A Wiley Interscience Publication, pp. 537–541.
"Mandrel–Wound Fiber Optic Pressure Sensor", P. Ogle, D. Gysling and A. Kersey, Docket CC–0033, pp. 1–22.
CiDRA Presentation on "Flow Meter", Dec. 7–18, 1998, Houston, TX.
"Sound and Sources of Sound", by A. P. Dowling and J. E. Williams, pp. 224–229.

\* cited by examiner

Primary Examiner—Diego Gutierrez
Assistant Examiner—Mirellys Jagan
(74) Attorney, Agent, or Firm—Howrey Simon Arnold & White, LLP

(57) ABSTRACT

An apparatus for sensing the temperature of a fluid being drawn from a well includes a pipe having a wall, a sensor mounted on the outer surface of the pipe wall, an insulator, and a housing attached to the pipe that encloses the sensor and the insulator. The fluid to be sensed is drawn from the well through the pipe. The thermal conductivity of the pipe wall is greater than that of the insulator.

50 Claims, 2 Drawing Sheets

NON-INTRUSIVE TEMPERATURE SENSOR FOR MEASURING INTERNAL TEMPERATURE OF FLUIDS WITHIN PIPES

BACKGROUND OF THE INVENTION

1. Technical Field

This invention relates to apparatus for sensing the temperature of fluid flow within a pipe in general, and to apparatus that can be used to non-intrusively sense fluid flow temperature within a pipe in particular.

2. Background Information

In the oil and gas industry, there is considerable advantage in having the ability to accurately measure the temperature of a fluid within a pipe at one or more locations down within a well ("downhole"). Until recently, fluid temperature has typically been sensed at the top or "wellhead" of a well. A problem with wellhead temperature data is that it can be influenced by heat transfer between the fluid and the pipe that occurs along the length of the pipe. Another problem with wellhead temperature data is that in multi-source wells, the fluid temperature data collected at the wellhead reflects a mixture of the fluid temperatures from the different sources and yields no temperature data specific to the individual sources. Knowing the temperature at a discrete locations within the well would avoid these problems and help enable the determination of relevant information that can be used to increase the productivity and efficiency of the source or sources.

Acquiring reliable, accurate temperature data in a downhole environment is, however, a technical challenge for at least the following reasons. First, fluid flow within a production pipe is hostile to sensors in direct contact with the fluid flow. Fluids within the production pipe can erode, corrode, wear, and otherwise compromise sensors disposed in direct contact with the fluid flow. In addition, the hole or port through which the sensor makes direct contact, or through which a cable is run, is a potential leak site. There is great advantage in preventing fluid leakage out of the production pipe. Second, the environment in most wells is harsh, characterized by extreme temperatures, pressures, and debris. Extreme temperatures (hot or cold) can disable and limit the life of electronic components, particularly those in contact with the fluid. Extreme temperature gradients between the fluid flow and the ambient environment can also undesirably influence the accuracy of a temperature sensor. An unprotected sensor disposed outside of a production pipe, for example, will likely be subject to thermal gradients between the fluid flow and the ambient environment; e.g., a subsea well application can have production pipe fluid temperatures up to and beyond 200 degrees Celsius (° C.) and ambient ocean environment temperatures of approximately 2–3° C. In such an instance, the unprotected sensor may be influenced more by the ambient temperature than by fluid temperature inside the production pipe. Sensors disposed outside of the production pipe may also be subject to debris and environmental materials such as water (fresh or salt), mud, sand, etc. Third, the well environment makes it inconvenient and/or expensive to access most sensors once they have been installed and positioned downhole.

What is needed, therefore, is a reliable, accurate, and compact apparatus for measuring temperature within a pipe, one that can measure the temperature of a fluid within a pipe in a non-intrusive manner, one that is operable in a well environment characterized by extreme temperatures and pressures and the presence of debris, and one that is not likely to need replacement or recalibration once installed.

DISCLOSURE OF THE INVENTION

It is, therefore, an object of the present application to provide an accurate, reliable, and compact apparatus for measuring fluid temperature within a pipe that can perform in a well environment in a non-intrusive manner.

According to the present invention, an apparatus for sensing the temperature of a fluid being drawn from a well includes a pipe having a wall, a sensor mounted on the outer surface of the pipe wall, a thermal insulator, and a housing attached to the pipe that encloses the sensor and the insulator. The fluid to be sensed is drawn from the well through the pipe. The thermal conductivity of the pipe wall is substantially greater than that of the insulator.

In a preferred embodiment, the housing forms a pressure vessel with the pipe, and the insulator and the sensor are disposed within the pressure vessel. Gases such as air, nitrogen and argon are favorable insulators, although other insulators can be used alternatively. The pressure of the gas within the pressure vessel can also be varied to suit the application; e.g., lesser or greater than ambient. The sensor mounted on the pipe and housed within the sensor housing can be any type of thermal sensor capable of sensing fluid temperature through the wall of the pipe with adequate sensitivity. In the most preferred embodiment, the sensor is a fiber Bragg Grating (FBG) type optical sensor.

An advantage of the present invention is that a compact apparatus for measuring temperature within a well is provided. The present invention fits compactly on the exterior of the production pipe and is therefore easily placed within the casing of a well.

Another advantage of the present invention is that it measures temperature of the fluid in a non-intrusive manner. The sensor mounted on the outer surface of the pipe does not require an opening extending into fluid flow path. As a result, a potential leak path into or out of the fluid flow path is eliminated. In addition, the sensor is protected from the fluid flow within the pipe.

The present sensor is also protected from the environment outside of the production pipe by the housing. The housing protects the sensor from fluid and debris that enters the annulus between the pipe and the well casing. The housing also protects the sensor by insulating it from elevated temperatures and pressures, and pressure variations present in the annulus. As a result, the present invention can use a wider variety of sensors than would otherwise be possible. In addition, in the embodiment where the sensor is disposed within a pressure vessel, the sensor is subjected to a substantially constant pressure. Variations in the pressure outside of the pressure vessel that might influence the sensor are effectively eliminated. For all of these reasons, the reliability and durability of the sensor is accordingly improved.

Another advantage of the present invention is that it has increased thermal capability over most temperature sensors currently used in a well application. The arrangement of the sensor mounted on the outer surface of the pipe where it is protected by the housing permits the use of optical sensors such as a FBG that have a thermal capacity higher than most conventional sensors used in well applications.

These and other objects, features and advantages of the present invention will become apparent in light of the detailed description of the present invention.

DETAILED DESCRIPTION OF THE INVENTION

Figure 1:
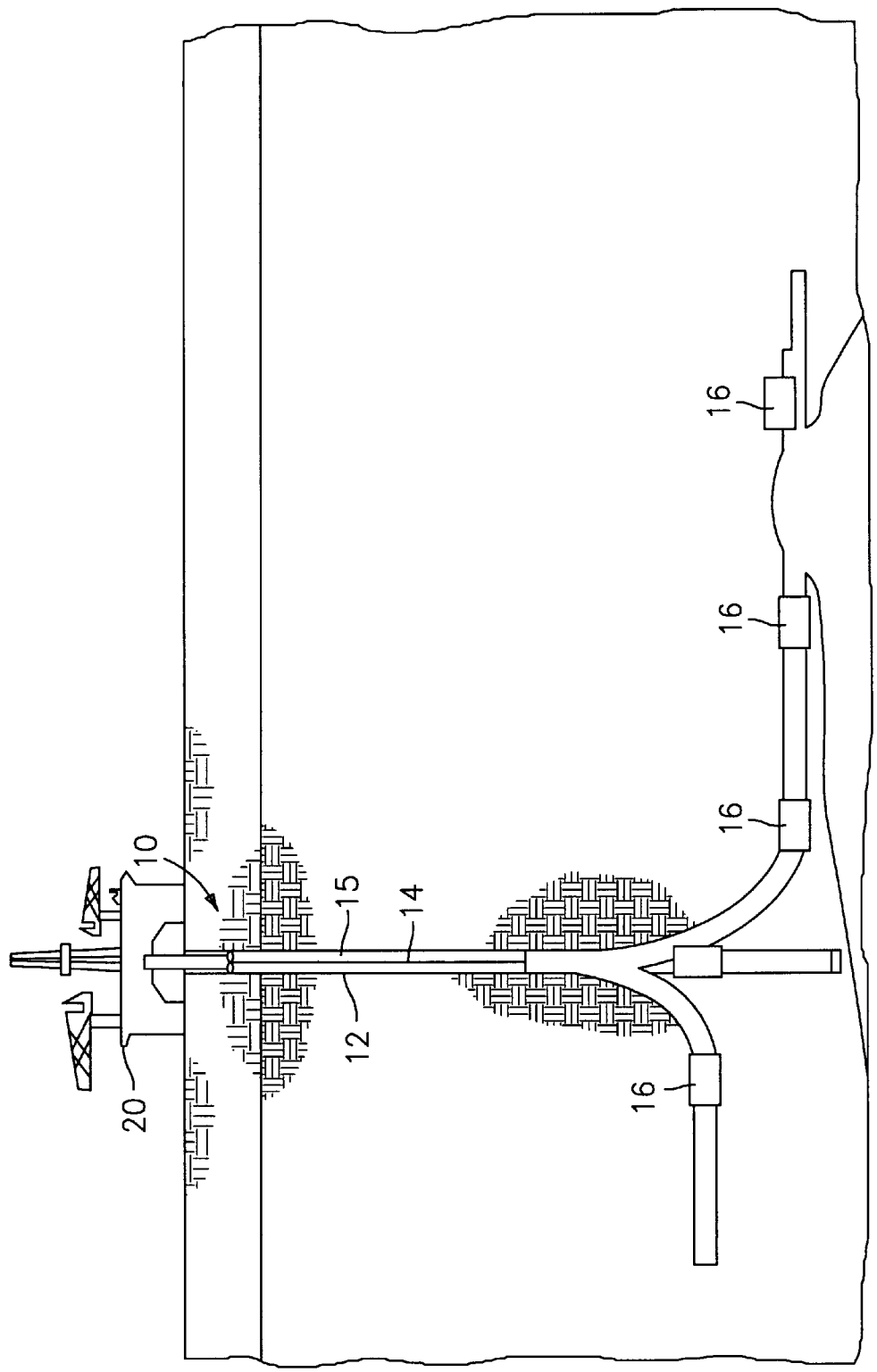
FIG. 1 is a diagrammatic view of a well having a casing and a pipe, and present invention thermal sensors positioned at various locations along the exterior of the pipe inside the casing.
Figure 2:
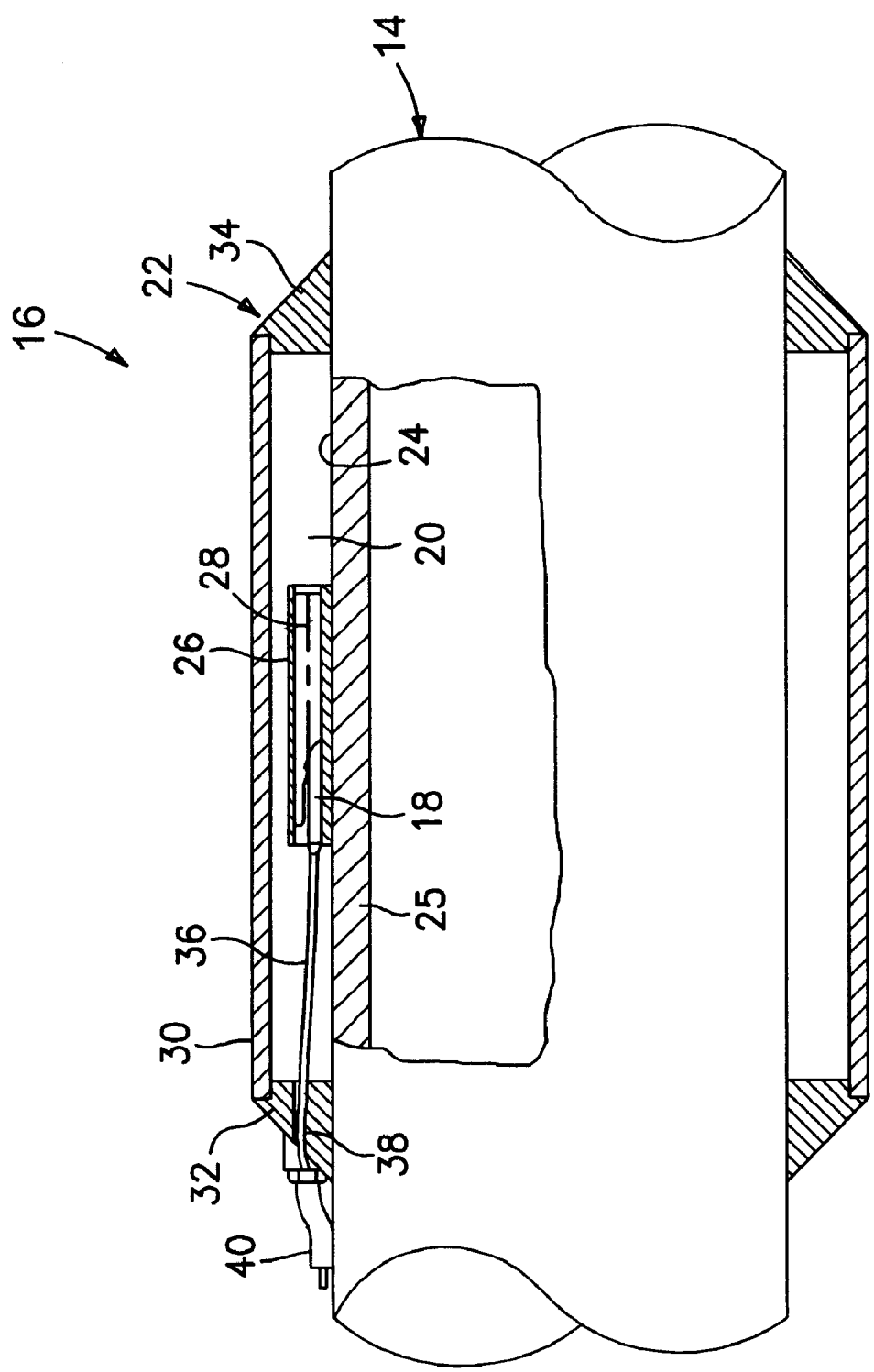
FIG. 2 is a diagrammatic cross-sectional view of the present invention apparatus for sensing temperature.

Referring to FIG. 1, a pipe arrangement 10 for use in an oil and/or gas production well includes a casing 12 which lines the well bore and a production pipe 14 ("the pipe") disposed inside the casing 12. An annulus 15 is formed between the pipe 14 and the casing 12. At one or more locations within the well, the pipe 14 includes apparatus 16 for sensing the temperature of fluid traveling within the pipe 14. Now referring to FIG. 2, the apparatus 16 includes a sensor 18, an insulator 20, and a housing 22. The sensor 18 is disposed outside the pipe 14, mounted on an outer surface 24 of a wall 25 of the pipe 14. The insulator 20 substantially surrounds the sensor 18. The term "mounted on", as it is used herein to describe the relation between the pipe 14 and the sensor 18, is defined to include direct or indirect connection between the sensor 18 and the pipe outer surface 24. Direct attachment exists when a surface of the sensor 18 is in physical contact with the pipe outer surface 24. Indirect attachment exists when there is little or no direct physical contact between the sensor 18 and the outer surface 24 of the pipe 14, but there is a thermally conductive medium disposed between the sensor 18 and the outer surface 24 of the pipe 14 that provides a thermal path to the sensor 18. For example, in some instances it may be preferable to dispose a thermally conductive material between the sensor 18 and the pipe outer surface 24 to promote thermal conduction from the pipe 14 to the sensor 18, and to provide a smooth surface on which the sensor 18 can lie. This is particularly true in those instances where the pipe outer surface 24 is relatively rough. In a preferred embodiment, the sensor 18 is disposed in a sleeve 26 that is fixed at one end to the pipe 14. The sleeve 26 protects the sensor 18, and attaching the sleeve 18 at one end reduces the possibility that mechanical or thermal strain that develops in the sleeve 26 will transfer to the sensor 18. In this embodiment, the thermal path to the sensor 18 is primarily through the sleeve 26. In a most preferred embodiment, the sensor 18 is attached to a member 28 made of a material that has thermal properties similar to those of the sensor 18 (e.g., thermal expansion coefficient, thermal response, etc.). That member 28 is then disposed in the sleeve 26 that is attached to the pipe outer surface 24. If the sensor 18 is a FBG, a member 28 consisting of a glass material (e.g., quartz, fused silica, etc.) is favorable because of the similarity in thermal properties between the glass material and the FBG. In this most preferred embodiment, the member 28 to which the sensor 18 is attached reduces the possibility that mechanical or thermal strain developed in the sleeve 26 will be transferred to the sensor 18.

The housing 22 is attached to the pipe 14 and encloses the insulator 20 and the sensor 18 against the pipe 14. The housing 22 includes a panel 30 extending between a pair of bosses 32,34. The panel 30 and bosses 32,34 preferably extend around the entire circumference of the pipe 14, although it may be acceptable in some instances to extend only a portion of the circumference. A sensor cable 36 extends through a sealable port 38 in one or both bosses 32,34 and connects with the sensor 18. Outside the housing 22, the sensor cable 36 is housed in a protective conduit 40 that is attached to the pipe 14. In the preferred embodiment, the housing 22 forms a pressure vessel with the pipe wall 25. The pressure within the pressure vessel may be greater than or less than the ambient pressure within the annulus 15 between the casing 12 and the pipe 14. The pressure vessel is built to withstand pressure gradients present in the well environment. In other embodiments, the housing 22 is sealed to contain and protect the insulator 20, but does not act as a pressure vessel. In all embodiments, the size and structure of the housing 22 are chosen to withstand the pressure gradients present in the well environment, to accommodate the size of the sensor 18, and to allow the sensor 18 to be positioned a distance away from the housing 22 such that heat transfer via the pipe 14 and/or the housing 22 is non-disabling for the application at hand.

In some applications, there is advantage in placing a plurality of bumpers within the housing to help maintain separation between the outer sleeve of the housing and the pipe. United States Patent Application Ser. No. 09/740,757 discloses bumpers that can be used in this manner and is hereby incorporated by reference.

The insulator 20 is a material that: 1) has a thermal conductivity less than that of the pipe 14; 2) does not interfere with the operation of the sensor 18; 3) will not functionally degrade in the well environment for a useful period of time; and 4) can withstand the temperatures and pressures present within the well environment. In the preferred embodiment, the insulator 20 is a material capable of acting as an effective acoustic isolator for the application at hand. An insulator 20 in fluid form can be disposed within the housing 22 at a pressure greater than, equal to, or less than ambient pressure. In a most preferred embodiment, the insulator 20 consists of a gas such as air, nitrogen, argon, or the like. An advantage of a gaseous insulator 20 is that it provides favorable acoustic isolation that helps reduce pressure wave interference that might otherwise travel into the housing 22 from the annulus 15 between the casing 12 and the pipe 14 and undesirably influence the sensor 18. Heat transfer from the ambient environment to the sensor 18 at a rate that will interfere with the sensing of the fluid within the pipe 14, is avoided by spacing the sensor 18 a minimum acceptable distance away from each boss 32,34 and by disposing an appropriate amount of insulator 20 in the space between each boss 32,34 and the sensor 18. The minimum acceptable distance accounts for thermal energy transferring from the ambient environment heat through each boss 32,34 and through the pipe 14 itself. The minimum acceptable distance will vary depending on the application, and can be adjusted to fit the application at hand.

The sensor 18 is a temperature sensing device having a predictable, repeatable response in the temperature range expected within a well, that is capable of sensing fluid temperature through the wall 25 of the pipe 14 with adequate sensitivity. In a preferred embodiment, the sensor 18 is an interferometric type fiber optic sensor. In the most preferred embodiment, the sensor 18 is a fiber Bragg Grating type (FBG) optical sensor. The FBG is a type of fiber optic strain gauge that exhibits favorable thermooptic effects in response to temperature change. Because strain within the FBG can be induced mechanically and or thermally, it is preferable to attenuate (or eliminate if possible) any sources of mechanical strain that might affect the FBG. In the present invention, mechanical strain within the FBG emanating from various sources is attenuated to an acceptable level by the attachment scheme described above utilizing a glass member 28 disposed within a sleeve 26. In addition, the pressurized vessel embodiment of the present invention also attenuates mechanical stress by substantially isolating the FBG from any pressure variations that might occur in the annulus 15 between the pipe 14 and the casing 12. Alternatively, if mechanically induced strain existing above the minimum acceptable level can be identified and quantified, then it may be acceptable in certain instances to have that level of mechanical strain provided it can be distinguished from the thermally induced strain.

Although this invention has been shown and described with respect to the detailed embodiments thereof, it will be understood by those skilled in the art that various changes in form and detail thereof may be made without departing from the spirit and the scope of the invention.

What is claimed is:

1. An apparatus for sensing temperature within a pipe, wherein the pipe is subject to an ambient pressure, comprising:
    a sensor disposed within a sleeve mounted on an outer surface of the pipe, wherein the sensor is coupled to a member disposed within the sleeve, and wherein the member and the sensor have substantially similar thermal properties;
    a housing enclosing the sleeve mounted on the pipe outer surface; and
    an insulator disposed in the housing, wherein the insulator thermally insulates the sensor from an environment outside the housing,
    wherein the insulator is maintained at a pressure different from the ambient pressure.

2. The apparatus of claim 1, wherein the insulator is a gas.

3. The apparatus of claim 1, wherein the insulator is a fluid.

4. The apparatus of claim 1, wherein the member is mounted within the sleeve in manner that attenuates the transfer of strain from the sleeve to the member.

5. The apparatus of claim 1, wherein the housing includes a panel extending between a pair of bosses mounted on the outer surface of the pipe.

6. The apparatus of claim 1, wherein the housing extends around the circumference of the pipe.

7. The apparatus of claim 1, wherein the insulator pressure is higher than the ambient pressure.

8. The apparatus of claim 1, wherein the insulator pressure is lower than the ambient pressure.

9. The apparatus of claim 1, wherein the pipe has a first thermal conductivity, and wherein the insulator has a second conductivity, and wherein the first thermal conductivity is greater than the second thermal conductivity.

10. The apparatus of claim 1, wherein the sensor is an optical sensor.

11. The apparatus of claim 10, wherein the sensor comprises a fiber Bragg grating.

12. An apparatus for sensing the temperature of a fluid in a pipe, wherein the pipe has a wall with first thermal conductivity and wherein the pipe is subject to an ambient pressure, comprising:
    a housing mounted on an outer surface of the pipe;
    a sensor disposed within a sleeve mounted on an outer surface of the pipe and within the housing, wherein the sensor is coupled to a member disposed within the sleeve, and wherein the member and the sensor have substantially similar thermal properties; and
    an insulator within the housing and having a second thermal conductivity, the insulator substantially surrounding the sensor;
    wherein the first thermal conductivity is greater than the second thermal conductivity, and
    wherein the insulator is maintained at a pressure different from the ambient pressure.

13. The apparatus of claim 12, wherein the insulator is a gas.

14. The apparatus of claim 12, wherein the insulator is a fluid.

15. The apparatus of claim 12, wherein the member is mounted within the sleeve in manner that attenuates the transfer of strain from the sleeve to the member.

16. The apparatus of claim 12, wherein the housing includes a panel extending between a pair of bosses mounted on the outer surface of the pipe.

17. The apparatus of claim 12, wherein the housing extends around the circumference of the pipe.

18. The apparatus of claim 12, wherein the insulator pressure is higher than the ambient pressure.

19. The apparatus of claim 12, wherein the insulator pressure is lower than the ambient pressure.

20. The apparatus of claim 12, wherein the sensor is an optical sensor.

21. The apparatus of claim 20, wherein the sensor comprises a fiber Bragg grating.

22. An apparatus for sensing temperature within a pipe, wherein the pipe is subject to an ambient pressure, comprising:
    a fiber Bragg grating disposed within a sleeve mounted on an outer surface of the pipe, wherein the grating is coupled to a member disposed within the sleeve, and wherein the member and the grating have substantially similar thermal properties;
    a housing enclosing the sleeve mounted on the pipe outer surface; and
    an insulator disposed in the housing, wherein the insulator thermally insulates the grating from an environment outside the housing,
    wherein the insulator is maintained at a pressure different from the ambient pressure.

23. The apparatus of claim 22, wherein the insulator is a gas.

24. The apparatus of claim 22, wherein the insulator is a fluid.

25. The apparatus of claim 22, wherein the grating is disposed within the sleeve in manner that attenuates the transfer of strain from the sleeve to the grating.

26. The apparatus of claim 22, wherein the housing includes a panel extending between a pair of bosses mounted on the outer surface of the pipe.

27. The apparatus of claim 22, wherein the housing extends around the circumference of the pipe.

28. The apparatus of claim 22, wherein the insulator pressure is higher than the ambient pressure.

29. The apparatus of claim 22, wherein the insulator pressure is lower than the ambient pressure.

30. The apparatus of claim 22, wherein the pipe has a first thermal conductivity, and wherein the insulator has a second conductivity, and wherein the first thermal conductivity is greater than the second thermal conductivity.

31. A system for measuring the temperature of produced fluid in an oil or gas well, comprising:
    a production pipe deployed down the well for transmitting the produced fluid to a surface of the well, wherein the pipe is subject to an ambient pressure;
    an optical sensor disposed on an outer surface of the pipe for determining the temperature of the produced fluid within the pipe, wherein the optical sensor is coupled to a member disposed within a sleeve, and wherein the member and the optical sensor have substantially similar thermal properties;
    a housing enclosing the sensor and mounted on the pipe outer surface; and an insulator disposed in the housing, wherein the insulator thermally insulates the sensor from an environment outside the housing, wherein the insulator is maintained at a pressure different from the ambient pressure.

32. The system of claim 31, wherein the insulator is a gas.

33. The system of claim 31, wherein the insulator is a fluid.

34. The system of claim 31, wherein the housing includes a panel extending between a pair of bosses mounted on the outer surface of the pipe.

35. The system of claim 31, wherein the housing extends around the circumference of the pipe.

36. The system of claim 31, wherein the insulator pressure is higher than the ambient pressure.

37. The system of claim 31, wherein the insulator pressure is lower than the ambient pressure.

38. The system of claim 31, wherein the pipe has a first thermal conductivity, and wherein the insulator has a second conductivity, and wherein the first thermal conductivity is greater than the second thermal conductivity.

39. The system of claim 31, wherein the optical sensor comprises a fiber Bragg grating.

40. A method for manufacturing an apparatus for sensing temperature within a pipe, wherein the pipe is subject to an ambient pressure, comprising:

mounting a sleeve containing a sensor on an outer surface of the pipe, wherein the sensor is coupled to a member disposed within the sleeve, and wherein the member and the sensor have substantially similar thermal properties;

mounting a housing on the outer surface of the pipe to enclose the sleeve;

disposing an insulator in the housing, wherein the insulator thermally insulates the sensor from an environment outside the housing; and maintaining the insulator at a pressure different from the ambient pressure.

41. The method of claim 40, wherein the insulator is a gas.

42. The method of claim 40, wherein the insulator is a fluid.

43. The method of claim 40, wherein the member is mounted within the sleeve in manner that attenuates the transfer of strain from the sleeve to the member.

44. The method of claim 40, wherein the housing includes a panel extending between a pair of bosses mounted on the outer surface of the pipe.

45. The method of claim 40, wherein the housing extends around the circumference of the pipe.

46. The method of claim 40, wherein the insulator pressure is higher than the ambient pressure.

47. The method of claim 40, wherein the insulator pressure is lower than the ambient pressure.

48. The method of claim 40, wherein the pipe has a first thermal conductivity, and wherein the insulator has a second conductivity, and wherein the first thermal conductivity is greater than the second thermal conductivity.

49. The method of claim 40, wherein the sensor is an optical sensor.

50. The method of claim 49, wherein the sensor comprises a fiber Bragg grating.

* * * * *